Feb. 22, 1966  E. J. ROBERTS  3,236,992
BRAZING APPARATUS
Filed July 11, 1961  3 Sheets-Sheet 1

INVENTOR.
ELLIOTT J. ROBERTS
BY
Philip Mintz
ATTORNEY.

Feb. 22, 1966  E. J. ROBERTS  3,236,992
BRAZING APPARATUS
Filed July 11, 1961  3 Sheets-Sheet 2

INVENTOR.
ELLIOTT J. ROBERTS
BY Philip Mintz
ATTORNEY.

Feb. 22, 1966    E. J. ROBERTS    3,236,992
BRAZING APPARATUS
Filed July 11, 1961    3 Sheets-Sheet 3

INVENTOR.
ELLIOTT J. ROBERTS
BY Philip Mintz
ATTORNEY.

United States Patent Office 3,236,992
Patented Feb. 22, 1966

3,236,992
BRAZING APPARATUS
Elliott J. Roberts, Westport, Conn., assignor to Dorr-Oliver Incorporated, Stamford, Conn., a corporation of Delaware
Filed July 11, 1961, Ser. No. 123,261
3 Claims. (Cl. 219—8.5)

This invention relates to method and apparatus for brazing, and more particularly to method and apparatus for making brazed articles by continuously wrapping strip metal.

Briefly this invention involves continuously wrapping strip metal under tension around a core (either permanent or removable) while continuously feeding flux and braze into the nip thus produced, heating sufficiently to fuse the braze without materially weakening the strip metal, and then cooling to solidify the braze.

When the strip metal is helically wound around a removable core in a helical pattern with each lap of the strip metal at least partially overlapping the preceding lap, the flux and braze is fed into the nip thus produced between successive overlapping portions, so that upon fusion of the braze and subsequent cooling, the overlapping portions of the strip metal are brazed to each other and not to the removable core. Where the strip metal is wound around a permanent core in a helical pattern, whether of the type wherein each lap of the strip metal at least partially overlaps the preceding lap or wherein each lap of the strip metal abuts the edge of the preceding lap, the braze and flux is continuously fed into the nip produced between the strip metal and the core, so that upon subsequent fusing and cooling of the braze, the strip metal is bonded to the permanent core.

In more limited aspects, it may be found desirable or necessary to utilize braze in continuous strip form and to precoat the strip braze with a flux liquor which is pre-dried prior to introduction of the fluxed braze into the nip. Where relatively wide strips of metal are helically wrapped to produce the finished article, a plurality of spaced relatively narrow strips of braze may be used. Heating to fusion of the fluxed braze may be performed continuously while the strip metal is being wrapped and the flux and braze is being fed into the nip, or, alternatively, the fusing of the braze may be conducted as a separate step subsequent to completion of the wrapping operation. Preferably, heating to fusion of the fluxed braze may be by high frequency induction heating. Cooling to solidify the braze may be by the use of ambient atmosphere, or, in special instances, by blowing cool gas against the heated strip metal.

For a clearer understanding of the nature of this invention, reference may be had to the subjoined description read in conjunction with the accompanying drawings illustrating some specific embodiments of this invention in which.

Figure 1:
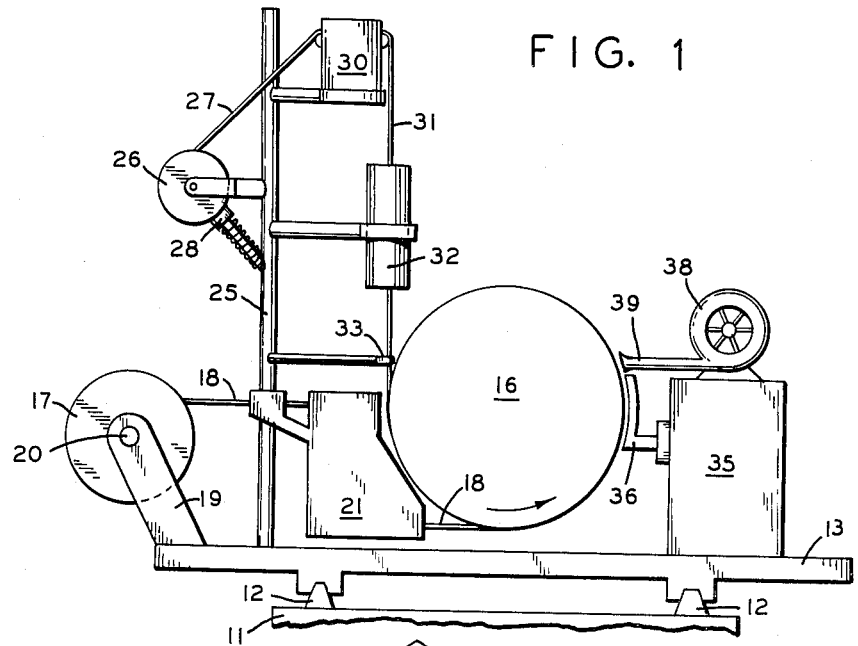
FIGURE 1 is a schematic elevational view of one form of apparatus embodying the principles of this invention.
Figure 2:
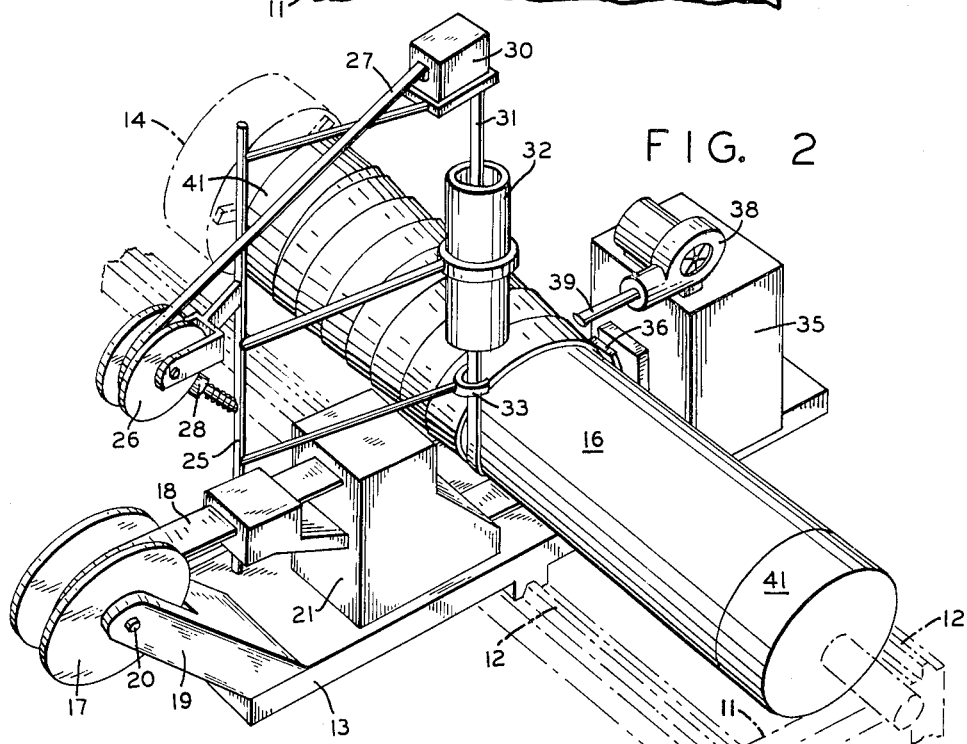
FIGURE 2 is a schematic perspective view of the apparatus of FIGURE 1 performing one embodiment of the process.

Referring next to the drawings, and more particularly to FIGURES 1 and 2, there is illustrated a conventional lathe having a lathe bed 11 supporting rails 12 on which lathe carriage 13 is movable toward and away from lathe chuck 14. Lathe chuck 14 supports for rotation core 16 about which strip metal is to be wrapped under tension in the formation of brazed articles by use of this invention. Through the use of conventional lathe gearing, the rate of movement of lathe carriage 13 longitudinally of core 16 along rails 12 may be synchronized with the rate of rotation of core 16.

Mounted on lathe carriage 13 for longitudinal movement therewith are means for continuously feeding strip metal under tension to be wrapped around core 16, means for continuously feeding flux and braze into the nip thus produced, means for heating the braze to its fusion temperature, and means for cooling the fused braze to solidify it. All of these means may be mounted on lathe carriage 13 by adjustable mountings (not shown) to permit accurate positioning thereof.

The means for continuously feeding strip metal under tension to be wrapped around core 16 includes a reel 17 of strip metal 18 rotatably mounted on support 19 by axle 20 and a tensioning device 21 which acts as a drag to oppose the pulling force exerted on strip metal 18 by the rotation of core 16. It will be noted that a nip is produced above the strip metal 18 near its line of tangency to core 16 as is clearly illustrated in FIGURE 1.

The means for continuously feeding flux and braze into the nip thus produced includes a support post 25 on which a reel 26 of strip braze 27 is mounted for rotary movement which can be retarded by brake means 28. Also mounted on support post 25 is flux coating device 30 which is supplied with a flux liquor, such as an aqueous suspension or solution of flux, to be applied to both sides of the strip braze 27 passing therethrough. The flux-coated braze strip 31 is then passed through a flux drier 32 and through bifurcated guide 33 which ensures accurate feeding of the braze strip into the nip.

The means for heating the braze to fusion includes an induction heater 35 provided with heating coil 36 mounted on lathe carriage 13 on the side of core 16 opposite to the previously described means for feeding strip metal 18 and strip braze 27. The means for cooling the braze to solidify it includes an air blower 38 provided with an outlet tube 39 from which the cooling air may be accurately discharged against the brazed article.

In making a pressure containing vessel of the construction described and claimed in the copending application of Dobell and Roberts, Serial No. 41,931, filed July 11, 1960, now Patent No. 3,133,659, the apparatus above described is operated as shown in FIGURE 2 to perform the following process. Removable core 16, provided with pressure vessel end portions 41, is placed in lathe chuck 14. A reel 17 of strip metal 18 of appropriate width is placed on support 19 and a reel 26 of strip braze 27 is placed on support 25.

As taught in the above mentioned application of Dobell and Roberts, the thickness and strength of the pressure containing vessel is a function of the degree of overlap of the strip metal on itself from one lap to another. This degree of overlap is obtained by setting the lathe gearing so lathe carriage 13 moves longitudinally by a distance equal to a preselected fractional portion of the width of strip metal 18 for each revolution of lathe chuck 14.

To start the formation of the pressure containing vessel, the lathe carriage 13 is positioned near one end of core 16. The end of strip metal 18 is withdrawn from reel 17, fed through tensioning device 21, and affixed to an end portion 41 on core 16. Rotation of lathe chuck 14 and core 16 is started with the concomitant longitudinal motion of lathe carriage 13 to thereby start wrapping strip metal 18 under tension around core 16 in the self-overlapping helical pattern. Then end of strip braze 27 is withdrawn from reel 26 against the retarding action of brake 28, passed through an aqueous suspension or solution of flux in coating device 30, passed through heater or flux drier 32, passed through guide 33 and inserted into the nip between the portion of strip metal 18 being fed around core 16 and the portion of the preceding lap of strip metal 18 already around core 16 where they overlap.

During the continued rotation of core 16, strip metal 18 is pulled from reel 17 against the retarding action of tensioning device 21, which provides the proper tension and tension distribution in strip metal 18 for winding it into the self-overlapping helical pattern desired. This same rotation of core 16 also pulls strip braze 27 from reel 26 against the retarding action of brake 28 through flux coating device 30, through flux drier 32, through guide 33 accurately into the overlapping portion of the nip produced by wrapping strip metal 18. Meanwhile, induction heater 35 acting through heating coil 36 continuously heats the braze to fusion while the above described wrapping operation progresses. If found necessary or desirable, air may be blown against the wrapped strip metal immediately after it passes adjacent to coil 36 to provide rapid cooling of the braze.

When the wrapping of strip metal 18 has progressed to the other end piece 41 on core 16, the strip metal is affixed to end piece 41 and rotation of the lathe chuck is stopped. After removal from the lathe, core 16 may be collapsed and removed from within the pressure containing vessel through any suitable opening in end piece 41.

Figure 3:
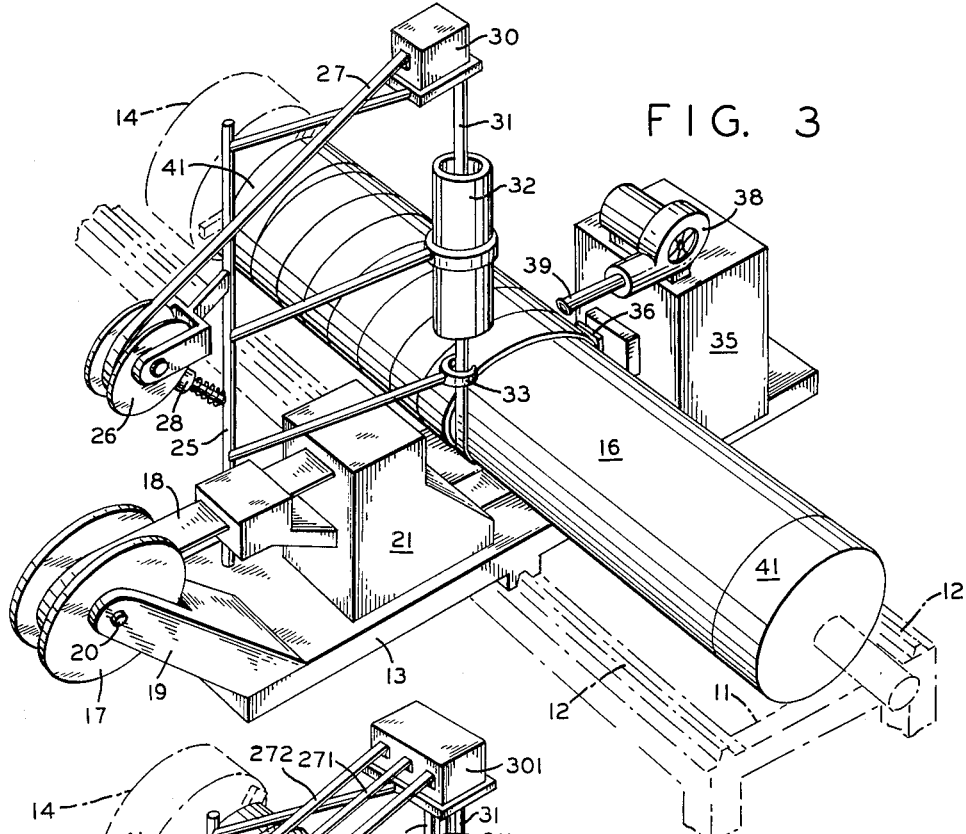
FIGURE 3 is a schematic perspective view of the apparatus of FIGURE 1 performing another embodiment of the process.

Referring next to FIGURE 3, there is illustrated substantially the same apparatus as is illustrated in FIGURE 2 being used to produce a modified product by a modified method. In FIGURE 3, the lathe gearing is set to move lathe carriage 13 longitudinally by a distance equal to the width of strip metal 18 for each revolution of lathe chuck 14 and core 16. In this fashion, strip metal 18 is wrapped around core 16 in a helical pattern wherein the opposite edges of the strip metal 18 abut each other in successive laps.

In this embodiment, fluxed strip braze 31 is fed into the nip produced between the strip metal 18 and the core 16. Upon fusing and solidifying of the braze, the helically wrapped strip metal will be firmly bonded to core 16. This operation may be repeated as often as desired to build up a plurality of layers of strip metal brazed to each other (core 16 representing the previously wrapped layers of strip metal to which an additional layer is being continuously brazed).

Figure 4:
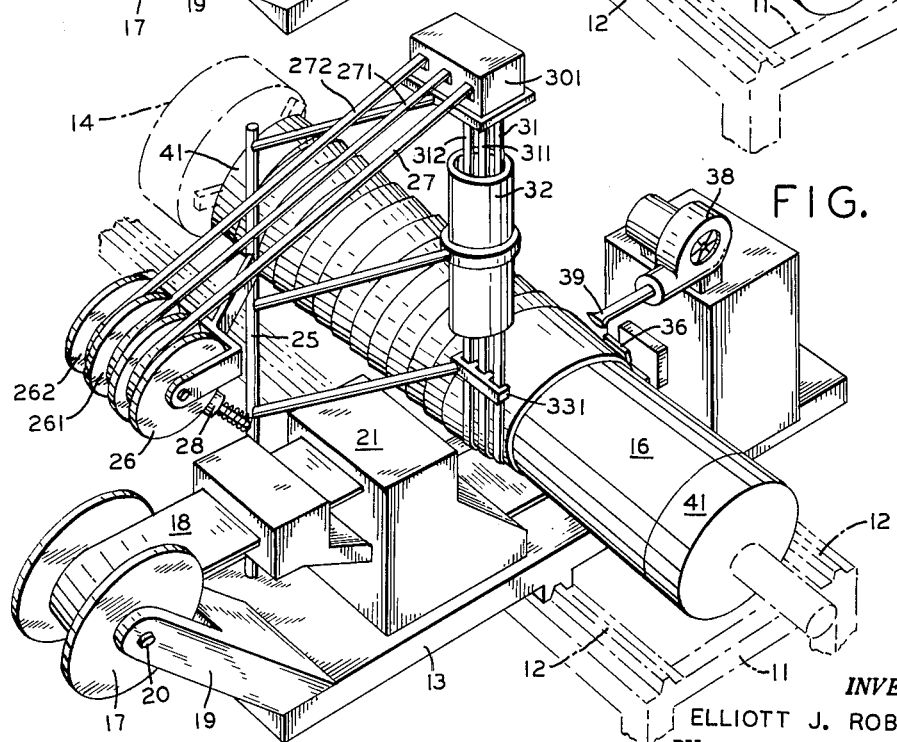
FIGURE 4 is a schematic perspective view of a slightly modified embodiment of the apparatus utilized to produce a product similar to that produced in FIGURE 2.

It has been found that where relatively wide strip metal 18 is utilized in this type of wrapping operation, the strength of the brazed joint may easily greatly exceed the strength of the metal. As illustrated in FIGURE 4, a plurality of relatively narrow strips of braze 27, 271, and 272 may be pulled from reels 26, 261, and 262 against the retarding action of brake 28 through flux coating device 301. The thus flux coated braze strips 31, 311, and 312 are then dried by heater 32 and guided by guide 331 into the nip produced by the wrapping of strip metal 18 about core 16. The rest of the apparatus and its mode of operation is identical with that already described with respect to FIGURES 1 and 2 or FIGURE 3 and, accordingly, will not be repeated here.

It is important that the relatively narrow strips of fluxed braze 31, 311, and 312 be spaced throughout the area to be brazed to ensure no weak portions will be developed. Guide 331 serves to accurately guide these strips into the nip with the appropriate spacing from each other.

Figure 5:
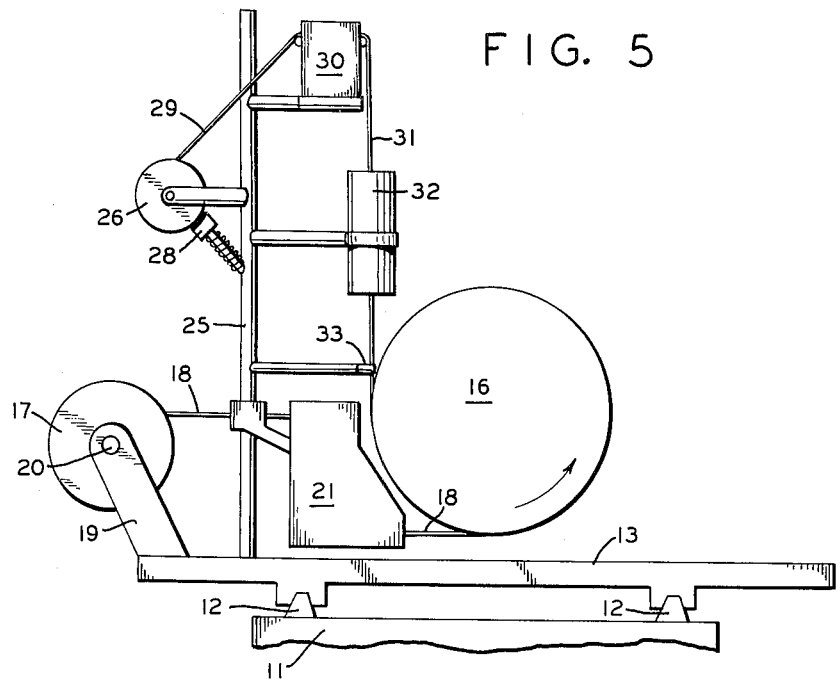
FIGURES 5 and 6 are schematic elevational views of another embodiment of apparatus for producing the products illustrated in FIGS. 2, 3 and 4 by a slightly modified embodiment of the method.
Figure 6:
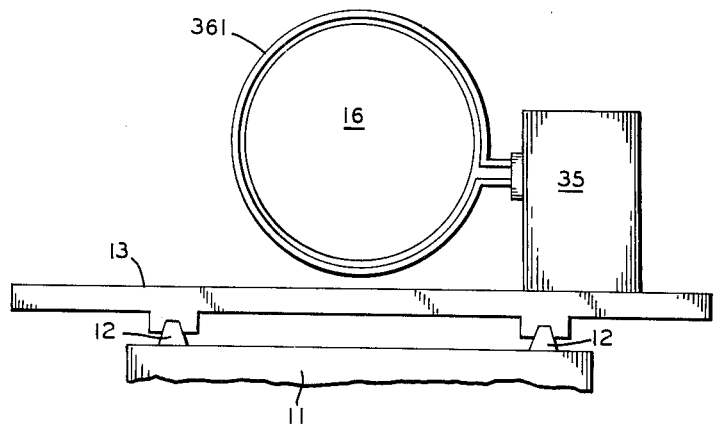

Referring next to FIGURES 5 and 6, there is illustrated apparatus suitable for carrying out another embodiment of the process of this invention. FIGURE 5 shows means for continuously feeding strip metal under tension to be wrapped around core 16 and means for continuously feeding flux and braze into the nip thus produced which means are identical with those illustrated and described in connection with FIGURES 1 to 4. It will be noted that FIGURE 5 does not, however, show any means for heating the braze to fusion temperature. FIGURE 6 shows mounted on lathe carriage 13 an induction heater 35 with heating coil 361.

In operation, the strip metal 18 and the flux-coated braze 31 are wrapped under tension around core 16 in the manner previously described in connection with FIGURES 1 to 4. After the continuous wrapping operation is completed, the entire product is then heated to fuse the braze by heating coil 361 and allowed to cool by ambient atmosphere.

The above specific embodiments of this invention have disclosed alternative ways of realizing certain aspects of this invention. It is readily apparent that those alternatives may be used with each other in any combination, not merely the specific combinations of alternatives illustrated.

While this invention has been illustrated and described in certain embodiments, it is readily apparent that obvious equivalents exist for specific details contained in the illustrative embodiments. It is intended that all such equivalents as may be embraced within the scope of the subjoined claims are to be considered as part of this invention.

I claim:

1. Apparatus for making brazed objects, comprising in combination
   means for continuously wrapping strip metal under tension around a core;
   means for supplying strip braze continuously into the nip produced by wrapping the strip metal around the core;
   means for coating said strip braze with flux liquor;
   means for drying the flux-coated braze strip;
   means for guiding the dried flux-coated braze strip into the nip;
   and means for heating the braze strip to its fusion temperature.

2. Apparatus for making brazed objects comprising, in combination, chuck means for supporting and rotating a core; carriage means moveable longitudinally of said core at a rate synchronized with the rate of rotation of said core; means supported by said carriage means for supplying strip metal under tension to be wrapped around said core including means for rotatably supporting a reel of strip metal and tensioning means for applying a retarding drag to said strip metal; means supported by said carriage means for feeding flux and braze into the nip produced by wrapping the strip metal under tension around the core including means for supplying strip braze, means for coating said strip braze with flux liquor, means for drying said flux liquor coated on said strip braze, and means for guiding the dry flux-coated strip braze into said nip; and induction heating means supported by said carriage means to effect fusion of the interleaved braze.

3. Apparatus for making brazed objects comprising, in combination, chuck means for supporting and rotating a core; carriage means moveable longitudinally of said core at a rate synchronized with the rate of rotation of said core; means supported by said carriage means for supplying strip metal under tension to be wrapped around said core including means for rotatably supporting a reel of strip metal and tensioning means for applying a retarding drag to said strip metal; means supported by said carriage means for feeding flux and braze into the nip produced by wrapping the strip metal under tension around the core including means for supplying a plurality of strips of braze, means for coating each of said strips of braze with flux liquor, means for drying said flux liquor coated on said strips of braze, and means for spacedly guiding the dry flux-coated strips of braze into said nip; and induction heating means supported by said carriage means to effect fusion of the interleaved braze.

(References on following page)

References Cited by the Examiner

UNITED STATES PATENTS

| | | |
|---|---|---|
| 344,350 | 6/1886 | Coas. |
| 1,019,043 | 3/1912 | Higgin. |
| 1,668,508 | 5/1928 | Kettering. |
| 2,237,309 | 4/1941 | McMinn _____ 219—85 |
| 2,433,966 | 1/1948 | Van Keuoen _____ 29—474.1 X |
| 2,600,630 | 6/1952 | Fergusson. |
| 2,627,010 | 1/1953 | Matteson et al. |
| 2,722,735 | 11/1955 | Beamish _____ 29—487 X |
| 2,926,421 | 3/1960 | Sandberg. |

FOREIGN PATENTS

| | | |
|---|---|---|
| 143,914 | 10/1951 | Australia. |
| 659,355 | 10/1951 | Great Britain. |

OTHER REFERENCES

The Metal Industry, Nov. 20, 1942, page 331.

JOHN F. CAMPBELL, *Primary Examiner.*